United States Patent
Lanzarotta et al.

(10) Patent No.: US 7,977,422 B2
(45) Date of Patent: Jul. 12, 2011

(54) NON-STAINING BLACK SIDEWALL

(75) Inventors: Joseph Lanzarotta, Uniontown, OH (US); Derek Donohue, Heathrow, FL (US)

(73) Assignee: Bridgestone Americas Tire Operations, LLC

( * ) Notice: Subject to any disclaimer, the term of this patent is extended or adjusted under 35 U.S.C. 154(b) by 891 days.

(21) Appl. No.: 10/567,986

(22) PCT Filed: Aug. 11, 2004

(86) PCT No.: PCT/US2004/025954
§ 371 (c)(1),
(2), (4) Date: Jul. 5, 2007

(87) PCT Pub. No.: WO2005/017020
PCT Pub. Date: Feb. 24, 2005

(65) Prior Publication Data
US 2007/0282050 A1    Dec. 6, 2007

Related U.S. Application Data

(60) Provisional application No. 60/494,384, filed on Aug. 11, 2003.

(51) Int. Cl.
*C08K 5/01* (2006.01)
*A61K 6/00* (2006.01)

(52) U.S. Cl. .................................... 524/490; 524/750

(58) Field of Classification Search ............. 524/490, 524/750
See application file for complete search history.

(56) References Cited

U.S. PATENT DOCUMENTS

| | | | |
|---|---|---|---|
| 4,633,016 A | 12/1986 | Buysch et al. | |
| 4,654,387 A | 3/1987 | Buysch et al. | |
| 4,754,066 A | 6/1988 | Buysch et al. | |
| 5,064,904 A | 11/1991 | Obrecht et al. | |
| 2001/0051677 A1* | 12/2001 | Bataille et al. | 524/156 |
| 2003/0089436 A1 | 5/2003 | Lanzarotta et al. | |
| 2009/0047890 A1* | 2/2009 | Yano et al. | 454/143 |

FOREIGN PATENT DOCUMENTS

| | | |
|---|---|---|
| CA | 1242744 | 10/1988 |
| CA | 2088427 | 8/1993 |
| CA | 2104529 | 12/1994 |
| CA | 2168702 | 3/1997 |
| CA | 2180887 | 8/1997 |
| CA | 2260757 | 8/1999 |
| CA | 2262258 | 9/1999 |
| CA | 2295368 | 8/2000 |
| DE | 3501 697 | * 7/1986 |
| DE | 19860724 | * 7/1986 |
| EP | 0761749 | 3/1997 |
| EP | 1148094 | 10/2001 |
| JP | 6041660 | 3/1985 |
| JP | 6157535 | 3/1986 |
| JP | 6157547 | 3/1986 |
| JP | 2284938 | 11/1990 |
| JP | 5271479 | 10/1993 |
| JP | 9111047 | 4/1997 |
| WO | 0132768 | 5/2001 |

OTHER PUBLICATIONS

DE 19860724, Bruck et al. (Jul. 1986), English Translation.* English translation of the specification and claims of German Publication No. 3501697 [3 pp.], (Jul. 1986).
Stuart, Laura, Jan. 31, 2011 Office Action from corresponding Canadian Patent Application No. 2535248 [3 pp.].
Maedea, T., Apr. 5, 2011 English translation of Office Action from corresponding Japanese Patent Application No. 2006-523315 [7 pp.].

* cited by examiner

*Primary Examiner* — William K Cheung
(74) *Attorney, Agent, or Firm* — Shaun Fox; Nathan Lewis

(57) ABSTRACT

The addition of a surfactant containing a thio functionality of the formula-S—, and specifically a polyether thioether surfactant to a rubber formulation results in a rubber compound having a glossy film on the outer, exposed surface.

19 Claims, 1 Drawing Sheet

NON-STAINING BLACK SIDEWALL

This application claims priority from U.S. Application Ser. No. 60/494,384 filed Aug. 11, 2003.

FIELD OF THE INVENTION

The present invention relates to rubber compositions and pneumatic tires using the same, and more particularly to a rubber composition for a tire component exposed to atmospheric conditions capable of maintaining a desirable appearance. Additionally, this invention provides a process for forming a protective film on the surface of a vulcanized rubber composition.

BACKGROUND OF THE INVENTION

Due to the nature of the elastomers used in rubber compounding, antidegradants are typically included in a rubber formulation to prevent atmospheric attack of the rubber compound. Elastomers having unsaturation in the polymer backbone are particularly vulnerable to ozone attack In order to prevent the reaction between atmospheric ozone, and the polymer backbone, materials which are considered "antiozonants" are commonly used, and may include materials which bloom to the rubber surface, preventing reaction of atmosheric ozone with the polymer. Certain waxes are known to migrate to the rubber surface, forming an inert film that provides a layer of protection to the rubber from atmospheric ozone. Other known antiozonants include chemicals that inhibit crack formation or minimize the rate of crack growth.

A drawback to these types of antiozonants is their effect on the appearance of the rubber surface. Wax films may cause the surface to appear dull, or hazy, while other antiozonants may cause a yellow to brown discoloration of the rubber surface, or staining of adjacent rubber surfaces to which they are in contact.

Previous attempts have been made to identify materials that prevent atmospheric attack of a rubber compound, while imparting a desirable appearance to the outer surface of the rubber. Particularly, U.S. Pat. No. 6,554,037 describes a rubber compound comprising the combination of an oxy radical containing polymer of a specific structure, and an alkali metal salt of an alkylsulphonic or alkylsulphuric acid. Additionally, U.S. Pat. No. 6,598,632 describes a rubber compound containing a polymer having an oxy radical, a polyoxyalkylene block of a specified formula and an end-group alcohol functionality. U.S. application Ser. No. 10/133,546 describes rubber compositions including a carboxylic acid ester of a polyhydroxy alcohol of a specific formula.

SUMMARY OF THE INVENTION

Presently, there is a need in the art for rubber compositions that are protected from atmospheric ozone attack, yet remain aesthetically pleasing. These compositions must also be cost effective from both material and manufacturing perspectives.

Applicants have discovered that the addition of a sulfur containing surfactant to a rubber formulation results in a rubber compound having a glossy film on the outer, exposed surface. Additionally, applicants have discovered that this film does not inhibit the ability of antidegradants within the compound to protect the rubber from atmospheric attack. Although not limited to this theory, this film appears to mask the appearance of such antidegradants on the outer surface of the rubber compound.

One aspect of the present invention is a rubber composition, and tires made therefrom, comprising a surfactant or combination of surfactants, wherein at least one surfactant contains a sulfur atom.

Another aspect of the present invention is a rubber compound, and tires made therefrom, comprising a surfactant containing a sulfur atom and excluding alkali metal salt of an alkylsulphonic or alkylsulphuric acid.

Another aspect of the present invention is a rubber compound, and tires made therefrom, comprising a surfactant containing a sulfur atom and excluding a polymer comprising an oxy group having linked to at least one side a polyoxyalkylene block of the formula $(C_nH_{2n}O)_x$ and wherein at least one block is linked to a hydrogen atom which is located at the chain end of said polymer.

Another aspect of the present invention is a rubber compound, and tires made therefrom, comprising a surfactant containing a sulfur atom and a reduced amount of wax or softeners, such as oils.

An additional aspect of the present invention is a rubber compound and tire made therefrom, comprising a sulfur-containing surfactant, and excluding silica filler.

Another aspect of the Applicant's invention is a process for forming a film on an exposed rubber surface, including adding a surfactant containing a sulfur atom to a rubber compound during mixing.

The term surfactant, as used herein, refers to a soluble compound that reduces interfacial tension between two liquids or a liquid and a solid. These types of surfactants may also be considered plasticizers and/or softeners within the art of rubber compounding.

EMBODIMENTS OF THE INVENTION

Elastomers for Rubber Compounds

Figure 1:
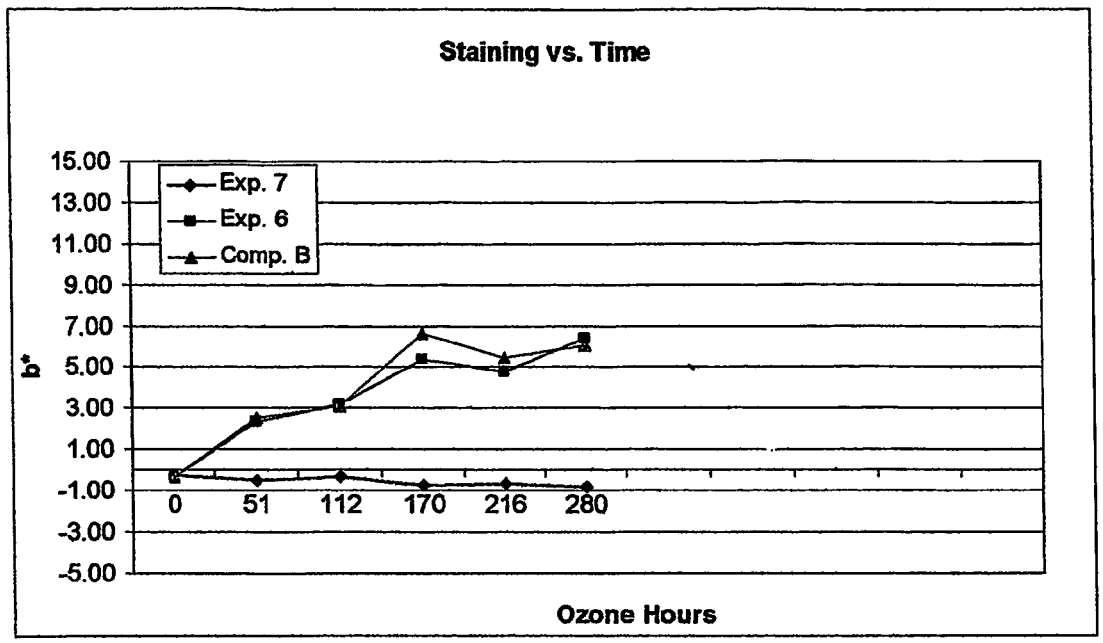
FIG. 1 is a plot of staining (b) of a rubber surface versus the amount of time such samples were exposed to ozone.

Any conventionally used elastomer for rubber compounding is potentially available for the advantages of the present invention arising from the use of a sulfur atom containing surfactant therewith.

Non-limiting examples of elastomers potentially useful in the present invention include the following, individually as well as in combination, according to the desired final viscoelastic properties of the rubber compound: Natural Rubber, Polyisoprene Rubber, Styrene Butadiene Rubber, Polybutadiene Rubber, Butyl Rubbers, Halobutyl Rubbers, Ethylene Propylene Rubbers, Crosslinked Polyethylene, Neoprenes, Nitrile Rubbers, Chlorinated Polyethylene Rubbers, Silicone Rubbers, Specialty Heat & Oil Resistant Rubbers, Other Specialty Rubbers, and Thermoplastic Rubbers, as such terms are employed in *The Vanderbilt Rubber Handbook*, Thirteenth Edition, (1990). These elastomers may contain a variety of functional groups, including but not limited to tin, silicon and amine containing functional groups.

Preferred elastomers include natural rubber, synthetic isoprene, styrene-butadiene copolymers, and butadiene rubber because of their common usage in the tire industry.

The ratios (often expressed as adding up to 100 parts) of such polymer blends can range across the broadest possible range according to the need of final viscoelastic properties desired for the polymerized rubber compound. One skilled in the art, without undue experimentation, can readily determine which elastomers in what amount is appropriate for a resulting desired viscoelastic property range.

Fillers

The elastomeric compositions of the invention are preferably compounded with reinforcing fillers, such as carbon black, silica, or mixtures thereof. Although carbon black is the preferred filler, it may be used exclusively or in combination with silica and or other non-reinforcing fillers.

The elastomers can be compounded with all forms of carbon black. The carbon black can be present in amounts ranging from about 0 to about 80 phr, with about five to about 60 phr being preferred. The carbon black can include any of the commonly available, commercially-produced carbon blacks, but those having a surface area (EMSA) of at least about 20 $m^2/g$ and, more preferably, at least about 35 $m^2/g$ up to about 200 $m^2/g$ or higher are preferred. Surface area values used in this application are determined by ASTM D-1765 using the cetyltrimethyl-ammonium bromide (CTAB) technique.

Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks.

A mixture of two or more of the above blacks can be used in preparing the carbon black products of the invention. Preferred are SAF, HAF or GPF type carbon blacks. The carbon blacks utilized in the preparation of the vulcanizable elastomeric compositions of the invention can be in pelletized form or an unpelletized flocculent mass.

Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. For purposes of the present invention, the surface area of the silicas should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about 0 to about 100 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (Piscataway, N.J.) (e.g., VN2, VN3), Rhone Poulenc (e.g., Zeosil® 1165MP), and J.M. Huber Corporation (Edison, N.J.).

When both carbon black and silica are employed in combination as the reinforcing filler, they are often used in a carbon black-silica ratio of about 10:1 to about 1:4.

Surfactants

The selection of a surfactant according to the present invention is based on the desired visual and viscoelastic performance of the resulting compound.

The surfactants of the present invention desirably have a thio group, —S—, within the chemical structure.

More preferably the surfactant is a thioether compound, and most desirably the surfactant is an ether thioether of Formula 1:

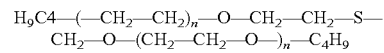

Two examples of ether thioether surfactants are Vulkanol® 85 and Vulkanol® OT, with the former being preferred, and both being produced by Bayer Corporation.

The amount of surfactant to be mixed into the vulcanizable rubber compound depends on the desired final appearance, as well as other environmental considerations such as expected ozone exposure. The amount of surfactant ranges from about 0 to about 10 phr, and preferably from about 0.5 to about 5 phr (parts per hundred rubber—where "hundred rubber" means 100 parts of elastomer(s)).

Additional and Optional Ingredients

Additional rubber compounding ingredients may include curing packages, processing aids, antioxidants and antiozonants, coupling agents, and the like. Without undue experimentation and utilizing patent and technical literature, one skilled in the art can develop a variety of specific vulcanizable rubber compounds for subsequent construction and vulcanization according to the specific rubber product desired.

For example, without limitation, compounds of the present invention will typically also contain such additional ingredients in the following amounts:

fillers: from about 0 to about 150 phr, and preferably from about 30 to about 80 phr;

processing oils/aids: from about 0 to about 75 phr, and preferably from about 0 to about 40 phr, antidegradants: from about 0 to about 10 phr, and preferably from about 0 to about 5 phr, stearic acid: from about 0 to about 5 phr, and preferably from about 0 to about 3 phr;

zinc oxide: from about 0 to about 10 phr, and preferably from about 0 to about 5 phr;

sulfur: from about 0 to about 10 phr, and preferably from about 0 to about 4 phr;

accelerators: from about 0 to about 10 phr, and preferably from about 0 to about 5 phr; and

USEFULNESS OF THE INVENTION

The addition of a surfactant containing a thio functionality, —S—, to a rubber composition unexpectedly results in rubber surfaces, that when exposed to ozone, form a glossy film on the exposed surface.

While not being limited to a particular theory, the use of a surfactant containing a thio functionality, —S—, in rubber compounds addresses a problem that conventional rubber compounds have, namely: discoloration of rubber surfaces exposed to atmospheric ozone. In this invention, the addition of certain surfactants results in compounds that while maintaining ozone protection, have an attractive exterior surface.

Further embodiments of the invention are described in the following examples.

EXAMPLES

General Experimental Testing Procedures

1. Rheometer

A Rheometer is used to determine the cure characteristics of compounded rubbers. The procedure used to measure the cure of rubber samples as reported in the current invention follows ASTM D 2084. The sample size was 30 mm in diameter and 12.5 mm in thickness or equivalent to a volume of 8 cm$^3$. The equipment used was a Monsanto Rheometer Model MDR2000.

2. Modulus, Tensile Strength and Elongation at Break

Modulus, Tensile Strength (Stress at Maximum Strain) and Elongation at Break are measured generally according to ASTM D 412 (1998) method B. Vulcanized rubber test specimens are cut into the shape of a ring, using a D412 B Type 1 die. The measurements for the above properties are based on the original cross sectional area of the test specimen. An instrument equipped to produce a uniform rate of grip separation, such as an Instron tensile tester, with a suitable dynamometer and an indicating or recording system for measuring applied force is used in conjunction with a measurement of extension of the test specimen. Modulus (100% (M100) and 300% (M300)), tensile strength (TB) and elongation (EB) are calculated according to the calculations set forth in ASTM D412 (1998).

3. Rebound

Rebound, the resilience of a rubber sample based on the ratio of returned to delivered energy, is measured generally according to test method ASTM D1054-91 (2000). A rubber sample is milled and cured according to ASTM D 1054, using the mold specified. The cured sample is then coated with talc, prior to conditioning. The sample is conditioned in an oven set at the requested temperature for approximately 1 hour. The conditioned sample is placed into a Zwick type rebound tester, such that a pendulum is swung against the sample, and the angle which it bounces back is measured. The percentage rebound is calculated using the equation found in D1054-91 (2000).

4. Ozone Testing (Bent Loop)

Bent loop surface ozone cracking helps to estimate a material's resistance to ozone. A 2.54 cm×2.54 cm×1.91 mm to 2.54 mm strip is cut with the grain from the material to be tested. This rubber strip is then cut into two (2) samples that are 7.62 cm long. The samples are labeled and marked with a 4.44 cm bench mark and then each sample is folded in the middle, and the ends are clamped together with a large binder clip. Next, the samples are attached to a rod, so they will be in an upright position during the test sequence.

The samples are placed into the ozone chamber for seven (7) days. The ozone chamber is kept at 50 parts of ozone to 100 million parts of air and at a temperature of 37.8° C.±1° C. The samples are checked daily for cracking. The time of the first signs of cracking is recorded. The samples are taken out of the chamber on the seventh day and visually inspected for the extent of cracking.

5. Color and Gloss

Color and Gloss are determined by the use of a Minolta CM2600D Spectrophotometer, calibrated according to the manufacturer's standards. Tires are exposed to 25 parts ozone per hundred million air while spinning on a tire drum. For this purpose, an ozone box, OREC model 0500/DM100 and ozone monitor, ®OREC model O3DM100 are used. At various points in time, the spinning tires are stopped, and spectrophotometer measurements are taken. These measurements, L, a and b describe 3 axes, and identify a unique color. The vector difference between two colors, dE, can be calculated as follows:

$$dE = \sqrt{((L_1 - L_2)^2 + (a_1 - a_2)^2 + (b_1 - b_2)^2}$$

Gloss is defined as the spectral reflectance produced by light hitting a surface, and can be expressed as the vectoral difference between the absolute color spectral component included of an object and the color reflected from its surface at a 10° angle.

General Experimental Materials Examples

In these Examples, rubber compounds containing varying amounts of a polyether thioether surfactant are compared to a compound without such surfactant.

Examples 1-5, and Comparative Example A

Comparative Example A (Comp. A) was representative of a carbon black filled sidewall composition. Experimental Examples 1-5, (Exp. 1-5) were modified versions of this compound, each containing from 0.5 to 3.0 parts per hundred rubber (phr) Vulkanol® 85.

Each of these examples were mixed in two mix stages. For the first non-productive mix stage, the ingredients were mixed for approximately 120 seconds to a temperature of about 155° C. The resulting rubber composition was then mixed with sulfur curatives, accelerators, antioxidants and optionally Vulkanol® 85 to a maximum temperature of about 77° C., for about 145 seconds in a final, productive mix stage.

Table 1 contains the formulations for each of Comparative Example A and Experimental Examples 1-5.

TABLE 1

| Materials | Comp. A | Exp. 1 | Exp. 2 | Exp. 3 | Exp. 4 | Exp. 5 |
|---|---|---|---|---|---|---|
| Masterbatch #1 | | | | | | |
| Butadiene Rubber | 60 | 60 | 60 | 60 | 60 | 60 |
| Natural Rubber | 40 | 40 | 40 | 40 | 40 | 40 |
| Processing Aids | 17 | 17 | 17 | 17 | 17 | 17 |
| Wax | 2 | 2 | 2 | 2 | 2 | 2 |
| Carbon Black[1] | 55 | 55 | 55 | 55 | 55 | 55 |
| Zinc Oxide | 2.5 | 2.5 | 2.5 | 2.5 | 2.5 | 2.5 |
| Stearic Acid | 1.5 | 1.5 | 1.5 | 1.5 | 1.5 | 1.5 |
| Antidegradants | 4.5 | 4.5 | 4.5 | 4.5 | 4.5 | 4.5 |

TABLE 1-continued

| Materials | Comp. A | Exp. 1 | Exp. 2 | Exp. 3 | Exp. 4 | Exp. 5 |
|---|---|---|---|---|---|---|
| Vulkanol ® 85 | 0 | 0.5 | 1.0 | 1.5 | 2.0 | 3.0 |
| Final | | | | | | |
| Curatives | 3.42 | 3.42 | 3.42 | 3.42 | 3.42 | 3.42 |

[1]N330 type carbon black;

Samples of each of these compounds were then vulcanized at a temperature of about 170° C. for about 15 minutes. The physical properties for the resulting vulcanized rubber are shown in Table 2.

TABLE 2

| | Comp. B | Exp. 1 | Exp. 2 | Exp. 3 | Exp. 4 | Exp. 5 |
|---|---|---|---|---|---|---|
| Rheometer | | | | | | |
| ML, in_lb | 0.99 | 0.97 | 0.99 | 1 | 0.95 | 0.96 |
| MH, in-lb | 9.06 | 8.87 | 9.31 | 9.16 | 9.17 | 8.94 |
| ts2 | 4.45 | 3.46 | 4.07 | 3.64 | 3.51 | 3.28 |
| t-10, min | 3.57 | 2.71 | 3.32 | 2.92 | 2.82 | 2.58 |
| t-50, min | 5.46 | 4.42 | 5 | 4.5 | 4.36 | 4.09 |
| t-90, min | 8.99 | 7.7 | 8.15 | 7.52 | 7.29 | 6.96 |
| Stress/ Strain | | | | | | |
| M300 @ RT | 6.547 | 6.13 | 6.415 | 6.325 | 6.1 | 6.229 |
| TB @ RT | 17.1 | 15.9 | 15.7 | 16.0 | 14.8 | 16.0 |
| EB @ RT | 589 | 583 | 561 | 575 | 552 | 581 |
| Zwick | | | | | | |
| Rebound, % RT | 59.1 | 59.0 | 59.4 | 59.0 | 58.5 | 59.0 |
| 65° C. | 65.1 | 63.4 | 54.6 | 64.9 | 65.0 | 65.9 |
| Ozone Testing- Bent Loop | | | | | | |
| Days to Break | No Break | No Break | No Break | No Break | No Break | No Break |

As can be seen by the data contained in Table 2, the physical properties of the black sidewall compound are not significantly affected by the addition of Vulkanol® 85.

Examples 6-7, and Comparative Example B

Comparative Example B (Comp. B) was representative of a carbon black filled sidewall. Experimental Examples 6-7, (Exp. 6-7) were modified versions of this compound, each containing either 0.75 or 1.75 phr Vulkanol® 85.

Each of Comparative Example B, and Experimental Examples 6 and 7 were mixed in two mix stages. For the first non-productive mix stage, the ingredients were mixed for approximately 120 seconds to a temperature of about 155° C. The resulting rubber composition was then mixed with sulfur curatives, accelerators, antioxidants and optionally Vulkanol® 85 to a maximum temperature of about 77° C., for about 145 seconds in a final, productive mix stage.

The rubber compositions of this set of Examples were comprised of ingredients listed in Table 3.

TABLE 3

| Materials | Comp. B | Exp. 6 | Exp. 7 |
|---|---|---|---|
| Masterbatch #1 | | | |
| Butadiene Rubber | 60 | 60 | 60 |
| Natural Rubber | 40 | 40 | 40 |
| Processing Aids | 17 | 17 | 17 |
| Wax | 2 | 2 | 2 |
| Carbon Black | 55 | 55 | 55 |
| Zinc Oxide | 2.5 | 2.5 | 2.5 |
| Stearic Acid | 1.5 | 1.5 | 1.5 |
| Antidegradants | 5 | 5 | 5 |
| Final | | | |
| Curatives | 3.42 | 3.42 | 3.42 |
| Vulkanol ® 85 | 0 | 0.75 | 1.75 |

Tires were then prepared having sidewalls comprised of each of Comp. B, and Exp. 6 and 7. Color and gloss data was obtained according to the test procedures described above. The results of such testing are included in Table 4.

TABLE 4

| | Comp. B | Exp. 6 | Exp. 7 |
|---|---|---|---|
| Color and Gloss 0 hours Ozone Exposure | | | |
| L | 22.95 | 24.18 | 25.13 |
| a | 0.02 | 0.03 | 0.03 |
| b | −0.36 | −.033 | −0.18 |
| dE | 0.441 | 0.571 | 1.191 |
| Color and Gloss 52 hours Ozone Exposure | | | |
| L | 25.57 | 23.10 | 26.11 |
| a | −0.04 | 0.20 | 0.10 |
| b | 2.54 | 2.45 | −0.54 |
| dE | 0.134 | 0.182 | 0.971 |
| Color and Gloss 116 hours Ozone Exposure | | | |
| L | 23.19 | 19.94 | 25.53 |
| a | 0.25 | 0.42 | 0.13 |
| b | 2.83 | 2.95 | −0.67 |
| dE | 0.356 | 0.384 | 0.968 |
| Color and Gloss 170 hours Ozone Exposure | | | |
| L | 25.11 | 21.72 | 25.43 |
| a | 1.10 | 0.81 | 0.09 |
| b | 6.62 | 5.37 | −0.75 |
| dE | 0.142 | 0.127 | 1.077 |
| Color and Gloss 216 hours Ozone Exposure | | | |
| L | 23.69 | 24.67 | 25.05 |
| a | 1.09 | 0.79 | 0.09 |
| b | 5.49 | 4.82 | −0.67 |
| dE | 0.100 | 0.098 | 1.227 |
| Color and Gloss 280 hours Ozone Exposure | | | |
| L | 22.81 | 22.61 | 24.59 |
| a | 1.21 | 1.24 | 0.10 |
| b | 6.05 | 6.41 | −0.80 |
| dE | 0.091 | 0.081 | 1.114 |

FIG. 1 is a plot of staining (b) versus the amount of time the samples were exposed to ozone. As seen from this chart, Compound B and Experimental Compound 6 show an increase in the staining, or discoloration of the rubber surface, as exposure to ozone increases. The plot of b values for Experimental Compound 7 remain virtually unchanged with increasing ozone exposure. This chart demonstrates that increasing levels of Vulkanol® 85 prevent the surface discoloration of rubber samples.

Figure 2:
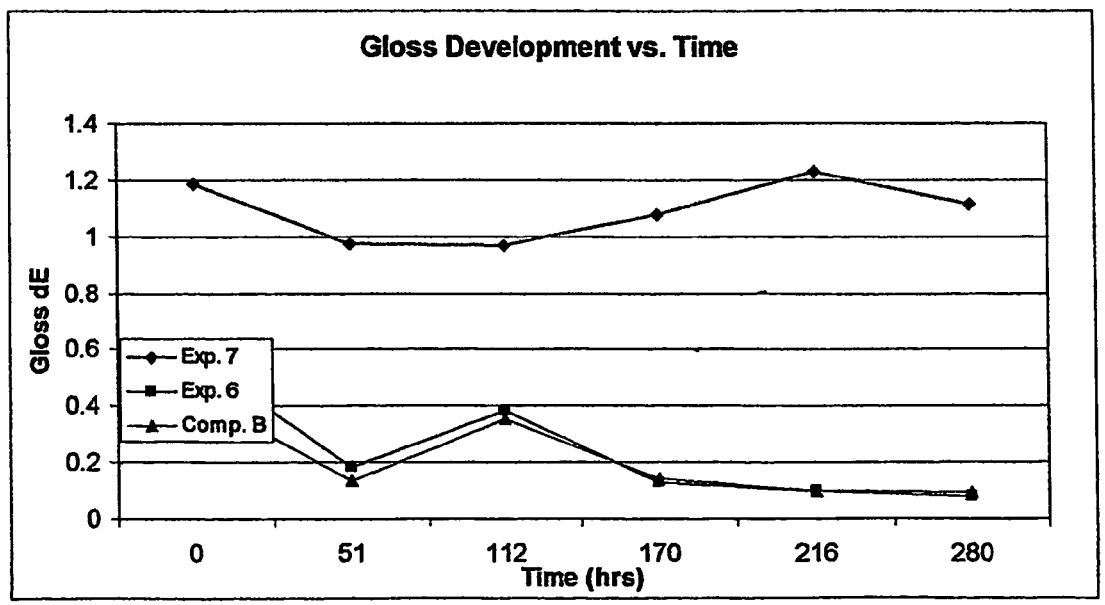
FIG. 2 is a plot of Gloss Development (Gloss dE) of rubber samples versus the number of hours the samples were in the ozone chamber.

FIG. 2 plots Gloss Development (Gloss dE) of the samples versus the number of hours these samples were in the ozone chamber. Again, the compound with the lower level of Vulkanol® 85 (Exp. 6) produces data similar to that of the control compound (Comp. B). The compound with higher levels of Vulkanol® 85 (Exp. 7) displays significantly higher gloss values than either of these compounds.

The invention is not limited to the above embodiments. The claims follow.

What is claimed is:

1. A rubber composition comprising
   a. an elastomer selected from the group consisting of natural rubber, polyisoprene rubber, styrene butadiene rubber, polybutadiene rubber, butyl rubber, halobutyl rubber, crosslinked polyethylene rubber, neoprenes, chlorinated polyethylene rubbers, silicone rubbers, and mixtures thereof;
   b. one or more antidegradants; and
   c. surfactant containing a thio functionality.

2. The rubber composition of claim 1, wherein the surfactant further comprises a thioether.

3. The rubber composition of claim 2, wherein the surfactant further comprises an ether thioether of the formula:

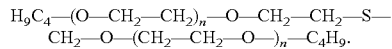

4. An elastomer based rubber composition comprising per 100 parts of elastomer, about 0.02 to about 5 parts per hundred rubber of a surfactant containing a thio functionality.

5. An elastomer based rubber composition comprising per 100 parts of elastomer, about 0.02 to about 5 parts per hundred rubber of a thioether surfactant.

6. The rubber composition of claim 4, wherein the elastomer has unsaturation in the polymer backbone.

7. The rubber composition of claim 4 wherein the surfactant is an ether thioether of the formula:

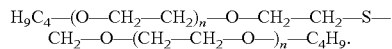

8. A vulcanized tire sidewall comprising
   a. an elastomer selected from the group consisting of natural rubber, polyisoprene rubber, styrene butadiene rubber, polybutadiene rubber, butyl rubber, halobutyl rubber, crosslinked polyethylene rubber, neoprenes, chlorinated polyethylene rubbers, silicone rubbers, and mixtures thereof;
   b. one or more antidegradants; and
   c. based on 100 part of elastomer about 0.02-10 parts of a surfactant containing a thio functionality.

9. A tire comprising a vulcanized sidewall component comprising
   a. an elastomer selected from the group consisting of natural rubber, polyisoprene rubber, styrene butadiene rubber, polybutadiene rubber, butyl rubber, halobutyl rubber, crosslinked polyethylene rubber, neoprenes, chlorinated polyethylene rubbers, silicone rubbers, and mixtures thereof;
   b. one or more antidegradants; and
   c. a surfactant containing a thio functionality.

10. A method of forming a film on the exposed surface of vulcanized rubber sidewall, comprising;
    adding about 0.02-10 parts of a surfactant containing a thio functionality to a rubber composition,
    curing said rubber composition,
    exposing the cured rubber composition to ozone;
       wherein the rubber composition comprises an elastomer selected from the group consisting of natural rubber, polyisoprene rubber, styrene butadiene rubber, polybutadiene rubber, butyl rubber, halobutyl rubber, crosslinked polyethylene rubber, neoprenes, chlorinated polyethylene rubbers, silicone rubbers, and mixtures thereof; and
       one or more antidegradants.

11. The rubber composition of claim 1, wherein the elastomer contains functional groups.

12. The rubber composition of claim 1, wherein said composition further comprises at least one reinforcing filler.

13. The rubber composition of claim 1, wherein said composition further comprises sulfur.

14. The rubber composition of claim 1, wherein the antidegradant comprises a wax.

15. The rubber composition of claim 1, wherein the elastomer is selected from the group consisting of: natural rubber, polyisoprene rubber, styrene butadiene rubber, and polybutadiene rubber.

16. The tire of claim 9, wherein the surfactant containing a thio functionality is present in a film on the sidewall component.

17. The vulcanized tire sidewall of claim 8, further comprising one or more antidegradants.

18. The vulcanized tire sidewall of claim 8, wherein the antidegradant comprises a wax.

19. The method of claim 10, further comprising adding one or more antidegradants to the rubber composition.

* * * * *